US012624995B2

(12) United States Patent
Schipper

(10) Patent No.: US 12,624,995 B2
(45) Date of Patent: May 12, 2026

(54) CALIBRATION LIGHT SOURCE AND METHOD OF CALIBRATING SPECTROMETERS

(71) Applicant: Endress+Hauser Optical Analysis, Inc., Ann Arbor, MI (US)

(72) Inventor: Darren Schipper, Ann Arbor, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 162 days.

(21) Appl. No.: 18/426,611

(22) Filed: Jan. 30, 2024

(65) Prior Publication Data

US 2025/0216256 A1    Jul. 3, 2025

Related U.S. Application Data

(60) Provisional application No. 63/615,917, filed on Dec. 29, 2023.

(51) Int. Cl.
*G01J 3/12* (2006.01)
*G01J 3/02* (2006.01)
*G01J 3/28* (2006.01)
*G01N 21/27* (2006.01)

(52) U.S. Cl.
CPC .............. *G01J 3/12* (2013.01); *G01J 3/0297* (2013.01); *G01J 3/28* (2013.01); *G01N 21/278* (2013.01); *G01J 2003/1213* (2013.01)

(58) Field of Classification Search
CPC .... G01J 3/12; G01J 3/0297; G01J 3/28; G01J 2003/1213; G01J 2003/2866; G01J 3/10; G01N 21/278; G01N 21/274
See application file for complete search history.

(56) References Cited

U.S. PATENT DOCUMENTS

| | | | | |
|---|---|---|---|---|
| 5,014,216 A | * | 5/1991 | Stafford ..................... | G01J 3/28 |
| | | | | 356/328 |
| 5,125,747 A | * | 6/1992 | Sayegh ................ | G01N 21/274 |
| | | | | 356/417 |
| 5,905,571 A | * | 5/1999 | Butler ........................ | G01J 3/18 |
| | | | | 356/326 |
| 6,351,306 B1 | | 2/2002 | Tedesco et al. | |
| 6,373,573 B1 | * | 4/2002 | Jung ..................... | A61B 5/4547 |
| | | | | 356/419 |

(Continued)

FOREIGN PATENT DOCUMENTS

| | | |
|---|---|---|
| DE | 4319567 C2 | 12/1997 |
| DE | 102017207186 A1 | 10/2018 |

(Continued)

*Primary Examiner* — Abdullahi Nur
(74) *Attorney, Agent, or Firm* — Gil M. Repa; Endress+Hauser (USA) Holding, Inc.

(57) ABSTRACT

A calibration light source includes: a broad band light source emitting light in a broad spectral range; and a filter receiving light emitted by the broad band light source and providing structured light by imposing an attenuation pattern exhibiting pattern features at multiple spectral reference lines on the received light such that an emission spectrum of the structured light emitted by the calibration light source exhibits distinct, identifiable emission spectrum features corresponding to the pattern features at the multiple spectral reference lines. A method of calibrating at least one spectrometer using the calibration light source is further disclosed.

17 Claims, 3 Drawing Sheets

(56) References Cited

U.S. PATENT DOCUMENTS

| | | | | |
|---|---|---|---|---|
| 6,423,249 B1 * | 7/2002 | Leveille | .................. | G01J 1/429 |
| | | | | 252/588 |
| 7,339,669 B2 * | 3/2008 | Matthiessen | ....... | G01N 21/3504 |
| | | | | 356/326 |
| 8,928,880 B2 * | 1/2015 | Youngner | ............ | G01J 3/0237 |
| | | | | 356/310 |
| 2003/0007147 A1 * | 1/2003 | Johnson | ............... | G02B 6/4298 |
| | | | | 356/326 |
| 2003/0174743 A1 * | 9/2003 | Cliche | .................. | H04B 10/504 |
| | | | | 359/337.2 |
| 2005/0018184 A1 * | 1/2005 | Imura | ....................... | G01J 3/10 |
| | | | | 250/226 |
| 2005/0156146 A1 * | 7/2005 | Leveille | .................. | G01J 1/429 |
| | | | | 356/6 |
| 2008/0030728 A1 * | 2/2008 | Nguyen | ............... | G01J 3/0262 |
| | | | | 356/301 |
| 2013/0027700 A1 * | 1/2013 | Youngner | ................ | G01J 3/14 |
| | | | | 356/310 |
| 2014/0176729 A1 * | 6/2014 | Saari | ..................... | G01J 3/0208 |
| | | | | 348/182 |
| 2020/0116643 A1 * | 4/2020 | Kun | ...................... | H01S 3/0085 |

FOREIGN PATENT DOCUMENTS

| | | | | |
|---|---|---|---|---|
| DE | 102017122689 A1 | 4/2019 | | |
| KR | 20220110316 A * | 8/2022 | ............ | G01J 3/0286 |

* cited by examiner

CALIBRATION LIGHT SOURCE AND METHOD OF CALIBRATING SPECTROMETERS

CROSS-REFERENCE TO RELATED APPLICATION

The present application is related to and claims the priority benefit of U.S. Provisional Application No. 63/615,917, filed on Dec. 29, 2023, the entire contents of which are incorporated herein by reference.

TECHNICAL FIELD

The present disclosure relates to a calibration light source and a method of calibrating at least one spectrometer using the calibration source.

BACKGROUND

Spectrometers, such as dispersive spectrometers, are, e.g., included in absorption measurement devices as well as in Raman spectrometric measurement devices currently employed in a large variety of different applications including industrial applications, as well as laboratory applications to determine and to provide measurement results of various measurands of a medium.

As an example, absorption spectra of a medium determined by a dispersive spectrometer of an absorption measurement device are, e.g., employed to determine and to provide measurement results of concentrations of components included in the medium, a turbidity of the medium and/or at least one other measurand.

As another example, Raman spectra of a sample of the medium determined by a dispersive spectrometer of a Raman spectroscopic measurement device are, e.g., employed to determine and to provide measurement results of concentrations of components included in the medium, a pH-value of the medium, a melt index of the medium, a cell motility of the medium, and/or at least one other measurand.

Dispersive spectrometers commonly include a disperser, e.g., a diffractive or holographic grating, dispersing incident light, and a detector including an array of detection elements, e.g., a CCD camera, an array of photodiodes or another type of detector array. The detection elements are arranged such that each detection element receives a different fraction of the dispersed light and determines and provides a detection signal corresponding to an intensity of the received fraction of the dispersed light. The detection signals are, e.g., provided to a signal processor determining and providing spectral intensity values of the intensity spectra of the light received by the detector based on the detection signals.

Dispersive spectrometers should be calibrated, before they are put into operation. Calibration commonly includes a calibration of a spectral axis of the spectrometer(s), e.g., a wavelength axis or a frequency axis, accounting for a distribution of the spectral lines of the dispersed light across the detection elements of the respective spectrometer.

As disclosed in U.S. Pat. No. 6,351,306 B1 the calibration of the wavelength axis of Raman spectrometers can e.g., be performed based on known atomic emission lines of a reference lamp, e.g., a neon or argon reference lamp. In this case, intensity spectra of light emitted by the reference lamp are determined with the Raman spectrometer to be calibrated and a mapping function correctly assigning the wavelengths or frequencies received by the individual detector elements to the respective element is determined based on the known atomic emission lines reflected in the intensity spectra.

A disadvantage of this method is however, that points of reference afforded by the atomic emission lines are predetermined by the reference lamp employed and may be absent in spectral ranges of special interest for a given spectroscopic application. This results in a correspondingly poor characterization of the spectral distribution in these spectral ranges.

In addition, the cost, complexity, and reliability of reference lamps exhibiting known atomic emission lines may render them undesirable for integration into, or deployment with, commercial spectrometers having expectations of low cost, low maintenance, reliable performance, and long service life.

Different dispersive spectrometers may exhibit different spectral responsivities. As a result, the spectral shape and the absolute spectral intensities of intensity spectra of identical samples determined by different spectrometers may be different. Some spectroscopic applications require for these differences to be compensated for. This can be achieved by calibration methods additionally including a calibration of an intensity axis of the spectrometers in a manner accounting for the spectral responsivity of the respective spectrometer.

In this context, U.S. Pat. No. 6,351,306 B1 discloses calibrating a spectral responsivity or intensity axis of a Raman spectrometer based on a known emission spectrum of a broad-band intensity calibration light source, e.g., a tungsten lamp. In this case, reference spectra of light emitted by the intensity calibration light source determined with the Raman spectrometer to be calibrated are used to determine the spectral responsivity of the respective Raman spectrometer and to subsequently adjust the determination of the spectral intensity values of the intensity spectra performed by the respective Raman spectrometer based on the reference spectra and the known emission spectrum of the broad-band intensity calibration light source.

A disadvantage of the calibration methods disclosed in U.S. Pat. No. 6,351,306 B1 is that calibrating both the spectral axis and the intensity axis of dispersive spectrometers requires a first calibration procedure to be performed with the reference lamp and a second calibration procedure to be performed with the intensity calibration light source.

In some applications, it maybe be necessary or desirable to verify the accuracy of a spectrometer's calibration before, after, or interspersed with spectroscopic measurements performed with the spectrometer, e.g., in order to accredit the validity of intensity spectra of samples of a medium determined by the spectrometer. Verifications can be performed, e.g., by determining an intensity spectrum of a reference sample, e.g., a pure substance, with the spectrometer and comparing the intensity spectrum determined based on the spectrometer's current calibration with a reference spectrum of the reference sample.

A disadvantage of this method is, however, that a distribution of spectroscopic information contained in the intensity spectra of the reference sample and the reference spectrum may not be well matched to a particular spectral range of interest in a specific target application. Selecting application-specific reference samples may be logistically impractical, and well-matched reference samples that are suitable for use in the field with commercial spectrometers may not always be available. In addition, in some cases high-quality reference samples may be hazardous substances or substances that are inconvenient or difficult to handle. A further problem associated to reference samples is that they may be sensitive to environmental conditions. This may lead to erroneous verification results when these reference samples are employed in the field under varying environmental conditions. Reference samples may also be encumbered by shipping, export, import, or other regulatory restrictions. Reference samples and samples of the medium in the target application may not be mutually compatible with the same sampling instrumentation, for example because of differences in the phase of matter of the samples (liquid vs. solid vs. gas), or due to solvent properties or other chemically reactive properties of the reference sample. Additional problems associated to reference samples, e.g., include that reference samples may be misidentified by operators that reference samples may become contaminated during handling, and/or that the composition of a reference sample may be adversely influenced by inaccuracy during its production and/or may not be stable over time.

Accordingly, there remains a need for further contributions in this area of technology.

As an example, there is a need for a calibration light source and/or a calibration method that an enables a calibration of the spectral axis of spectrometers that provides a better characterization of the spectral distribution throughout the spectral measurement range of the spectrometers and/or that can be performed in a more cost effective and/or efficient manner.

As another example, there is a need for a calibration light source and/or a calibration method that enables calibrations including verifying previously performed calibrations and/or calibrations of the spectral axis, the intensity axis, or both the spectral axis and the intensity axis of spectrometers in a more efficient manner.

SUMMARY

The present disclosure includes a calibration light source for calibrating at least one spectrometer, the calibration light source comprising:

a broad band light source emitting light in a broad spectral range; and
    a filter receiving light emitted by the broad band light source and providing structured light by imposing an attenuation pattern exhibiting pattern features at multiple spectral reference lines on the received light such that an emission spectrum of the structured light emitted by the calibration light source exhibits identifiable emission spectrum features corresponding to the pattern features at the multiple spectral reference lines.

The emission spectrum of the calibration light source exhibiting the identifiable emission spectrum features at the multiple spectral reference lines provides the advantage that the calibration light source enables calibrations of the spectral axis of spectrometers throughout the broad spectral range covered by the multiple spectral reference lines.

At the same time, the emission spectrum of the calibration light source extending across the broad spectral range covered by the broad band light source provides the advantage that it enables calibrations of an intensity axis of spectrometers to be performed throughout the broad spectral range.

In addition, the calibration light source provides the advantage that it enables for previously performed calibrations of spectrometers, e.g., previously performed calibrations of the spectral axis and/or the intensity axis, to be verified.

In certain embodiments, the emission spectrum features include edges, maxima, minima and/or other types of identifiable features, each occurring at one of the spectral reference lines, the emission spectrum features include at least one special feature that is distinguishable from the other emission spectrum features, and/or the attenuation pattern is a wavelength-dependent (or frequency-dependent) pattern of alternatingly increasing and decreasing attenuation or a sawtooth pattern causing the emission spectrum of the calibration light source to exhibiting a correspondingly alternatingly increasing and decreasing intensity.

According to further embodiments, the filter includes at least one filtering element or a combination of filtering elements; the filtering element(s) including an etalon filter, a multivariate optical element filter, a jammed array wideband sawtooth filter, an interference filter, and/or another type of optical filtering element.

According to an alternative embodiment, the filter includes a gas exhibiting known atomic absorption lines. In this alternative embodiment, the gas is a pure gas consisting of a single component or a mixed gas including two or more components exhibiting different atomic absorption lines, and/or the gas includes neon, argon, xenon and/or at least one other component. In addition, the light emitted by the broad band light source is transmitted through the gas selectively absorbing fractions of the light at the spectral reference lines corresponding to the atomic absorption lines of the gas.

According to a refinement of the alternative embodiment the filter includes a container containing the gas, the container is a cell, a tube, a flexible tube that is at least partially arranged in a coil, a hollow core optical fiber, a hollow core optical fiber that is at least partially arranged in a coil, or another type of container, the container includes a light inlet or a transparent window closing off the container, through which light emitted by broad band light source enters the container, and the container includes a light outlet or a transparent window closing off the container, through which the structured light exits the container.

In certain embodiments, the broad band light source includes a black-body radiator, an incandescent lamp or a tungsten lamp. In alternative embodiments, the broad band light source includes an excitation light source or a laser providing excitation light and a luminescent material emitting luminescence light in response to the luminescent material receiving the excitation light, wherein the luminescent material is a fluorescent material, a fluorescent glass or another type of luminescent material.

The present disclosure further includes a method of calibrating at least one spectrometer, the method comprising:

providing a calibration light source comprising a broad band light source emitting light in a broad spectral range and a filter receiving light emitted by the broad band light source and providing structured light by imposing an attenuation pattern exhibiting pattern features at multiple spectral reference lines on the received light such that an emission spectrum of the structured light emitted by the calibration light source exhibits identifiable emission spectrum features corresponding to the pattern features at the multiple spectral reference lines;
    providing a reference characteristic of the structured light emitted by the calibration light source; the reference characteristic including at least one of the emission spectrum of the calibration light source and the reference lines at which the emission spectrum features of the emission spectrum of the calibration light source occur; and

for each spectrometer performing the method steps of with the respective spectrometer determining a calibration spectrum of the structured light emitted by the calibration light source; and calibrating the respective spectrometer based on the calibration spectrum and the reference characteristic.

The method provides the advantage that the use of the calibration light source enables for the calibrations to include verifying previously performed calibrations and/or calibrations of the spectral axis, the intensity axis or both the spectral axis and the intensity axis of spectrometers to be performed in a more efficient manner based on the calibration spectra of the structured light provided by the calibration light source.

In certain embodiments, for each spectrometer the method step of calibrating the respective spectrometer includes calibrating a spectral axis and/or an intensity axis of the respective spectrometer and/or verifying a previous calibration of the respective spectrometer.

According to a first embodiment of the method, the reference characteristic includes the spectral reference lines, and for at least one or each of the at least one spectrometer to be calibrated, the method step of calibrating the respective spectrometer includes calibrating a spectral axis of the spectrometer by identifying calibration spectrum features included in the calibration spectrum, determining calibration spectrum lines at which the identified calibration spectrum features occur, and calibrating the spectral axis of the respective spectrometer based on the calibration spectrum lines and the corresponding spectral reference lines, at which the emission spectrum features corresponding to the calibration spectrum features occur.

Refinements of the first embodiment of the method include embodiments, wherein:

a) for each calibration spectrum feature, the emission spectrum feature corresponding to the respective calibration spectrum feature is determined based on an order of occurrence of the calibration spectrum features along the spectral axis corresponding to an order of occurrence of the emission spectrum features along the spectral axis and the spectral reference line corresponding to the calibration spectrum line at which the respective calibration spectrum feature occurred is given by the spectral reference line at which the corresponding emission spectrum feature occurs; and/or b) wherein the emission spectrum features include a special feature that is distinguishable from the other emission spectrum features, the calibration spectrum includes a special calibration spectrum feature corresponding to the distinguishable special feature that is distinguishable from the other calibration spectrum features; the special calibration spectrum feature and the corresponding special feature of the emission spectrum are taken as reference points; and the determination of the emission spectrum features corresponding to the other calibration spectrum features is performed based on their order of occurrence along the spectral axis relative to the reference points.

A further refinement of the first embodiment includes an embodiment of the method, wherein:

at least one of the spectrometers includes a disperser dispersing incident light, a detector including an array of detection elements and a signal processor determining and providing intensity spectra of the light received by the detector; wherein each detection element receives a fraction of the dispersed light and provides a detection signal corresponding to an intensity the received fraction of the dispersed light; and wherein the signal processor determines and provides spectral intensity values of the intensity spectra based on the detection signals; and calibrating the spectral axis of the respective spectrometer includes based on the calibration spectrum lines and the corresponding reference lines determining and subsequently applying a mapping function correctly assigning spectral lines received by the individual detector elements to the respective detector elements such that calibration spectrum lines of a calibration spectrum determined by the respective spectrometer based on this mapping function coincide with the corresponding spectral reference lines.

The disclosure further includes a second embodiment of the method, wherein the reference characteristic includes the emission spectrum of the calibration light source, and for at least one or each of the at least one spectrometer to be calibrated, the method step of calibrating the respective spectrometer includes calibrating an intensity axis of the respective spectrometer based on spectral intensity values of the calibration spectrum and corresponding spectral intensity values the emission spectrum.

A refinement of the second embodiment includes an embodiment of the method, wherein calibrating the intensity axis of the respective spectrometer includes adjusting a determination of spectral intensity values of intensity spectra performed by the respective spectrometer by determining and applying spectral correction terms, spectral correction factors or a spectral correction function for correcting spectral intensity values determined by the respective spectrometer such that the corrected spectral intensity values of the calibration spectrum correspond to the spectral intensity values of the emission spectrum of the calibration light source.

In certain embodiments of the method disclosed herein, the reference characteristic includes the emission spectrum and the spectral reference lines, and for at least one or each of the at least one spectrometer to be calibrated the method step of calibrating the respective spectrometer includes: identifying calibration spectrum features included the calibration spectrum, determining calibration spectrum lines at which the identified calibration spectrum features occur, and calibrating the spectral axis of the respective spectrometer based on the calibration spectrum lines and the corresponding spectral reference lines at which the emission spectrum features corresponding to the calibration spectrum features occur; and subsequently calibrating an intensity axis of the respective spectrometer based on spectral intensity values of the calibration spectrum and corresponding spectral intensity values of the emission spectrum.

The disclosure further includes a third embodiment of the method, wherein the reference characteristic includes the emission spectrum, and for at least one or each spectrometer, that has previously been calibrated, the method step of calibrating the respective spectrometer includes based on the calibration spectrum determined by the respective spectrometer and the emission spectrum of the calibration light source verifying the previous calibration of the respective spectrometer and determining and providing a corresponding verification result.

A refinement of the third embodiment includes the method, wherein:

verifying the previous calibration of the respective spectrometer includes determining a degree of correspondence between the calibration spectrum determined by the respective spectrometer and the emission spectrum of the calibration light source; and determining and providing the verification result includes providing a positive verification result indicating that the previous calibration of the respective spectrometer is valid when the degree of correspondence is larger or equal to a predetermined threshold, and/or providing a negative verification result indicating that the previous calibration of the respective spectrometer is invalid when the degree of correspondence is smaller than the predetermined threshold.

According to a further refinement of the third embodiment the method further comprises for at least one or each spectrometer, for which a verification result indicating that the previous calibration of the respective spectrometer is invalid has been determined, performing a method step of based on the calibration spectrum determined by the respective spectrometer and the reference characteristic of the light emitted by the calibration light source re-calibrating the spectral axis and/or the intensity axis of the respective spectrometer.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure includes a calibration light source for calibrating at least one dispersive spectrometer and a method of calibrating at least one dispersive spectrometer using the calibration light source.

Figure 1:
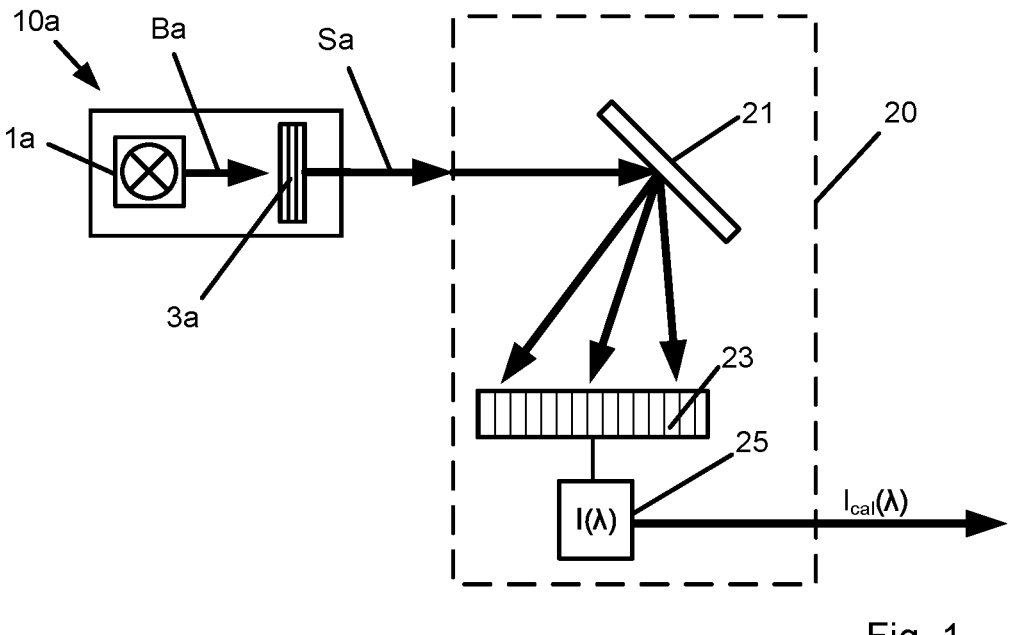
FIG. 1 shows a schematic of a calibration light source according to the present disclosure and a spectrometer.

An exemplary embodiment of the calibration light source 10a and an exemplary embodiment of a dispersive spectrometer 20 to be calibrated are shown in FIG. 1.

Figure 2:
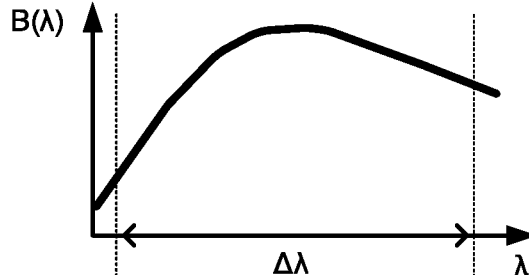
FIG. 2 shows an example emission spectrum of a broad band light source in arbitrary units.

The calibration light source 10a comprises a broad band light source 1a and a filter 3a. The broad band light source 1a is configured to emit light Ba in a broad spectral range, e.g., a spectral range including a spectral measurement range $\Delta\lambda$, e.g., a wavelengths measurement range or a frequency measurement range, of the spectrometer(s) 20 to be calibrated. An exemplary broad band emission spectrum B($\lambda$) of the light Ba emitted by the broad band light source 1a is shown in FIG. 2.

With respect to the broad band light source 1a, light sources currently used for calibrating a spectral responsivity or an absolute or relative intensity of spectrometers may be used.

As shown in FIG. 1, in certain embodiments, the broad band light source 1a is, e.g., a black-body radiator, e.g., an incandescent lamp, e.g., a tungsten lamp.

Figure 3:
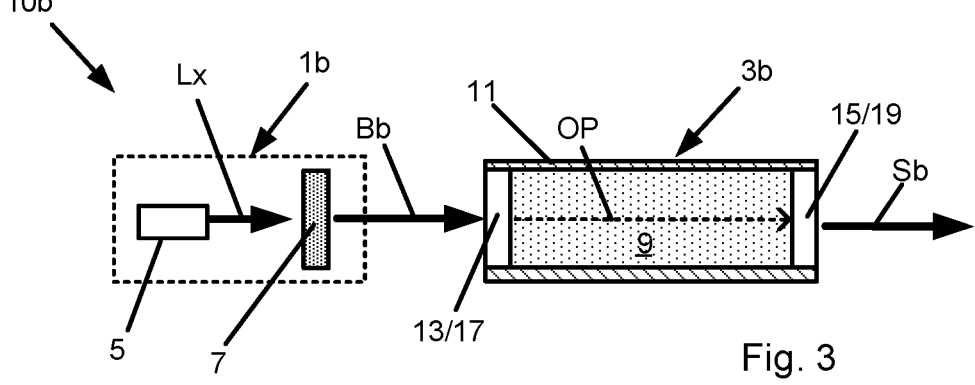
FIG. 3 shows a further embodiment of a calibration light source according to the present disclosure.

FIG. 3 shows a further embodiment of the calibration light source 10b, wherein the broad band light source 1b includes an excitation light source 5, providing excitation light Lx, e.g., a laser or another type of excitation light source, and a luminescent material 7 receiving the excitation light Lx and emitting luminescence light in response. In such an embodiment, the light Bb emitted by the broad band light source 1b includes luminescence light emitted by the luminescent material 7 in response to the luminescent material 7 receiving excitation light Lx provided by the excitation light source 5 illuminating the luminescent material 7.

In certain embodiments, the luminescent material 7 is, e.g., a fluorescent material, e.g., a fluorescent glass. Fluorescent materials suitable for this purpose, e.g., include standard reference materials (SRM) developed for a number of different excitation wavelengths by the National Institute of Standards and Technology (NIST) for relative intensity correction of Raman spectroscopic instruments. These standard reference materials (SRM) include specific types of fluorescent glasses, which are available together with published emission spectra thereof.

Regardless of the type of the broad band light source 1a, 1b employed, the filter 3a, 3b is e.g., an attenuation pattern filter or another type of filter configured to receive the light Ba, Bb emitted by the broad band light source 1a, 1b and to provide structured light Sa, Sb by imposing an attenuation pattern exhibiting distinct (e.g., identifiable, recognizable, pronounced) pattern features at multiple spectral reference lines $\lambda$ri on the received light Ba, Bb such that an emission spectrum Ea($\lambda$) Eb($\lambda$) of the structured light Sa, Sb emitted by the calibration light source 10a, 10b exhibits distinct emission spectrum features Fi, each corresponding to one of the pattern features, at the multiple spectral reference lines $\lambda$ri.

In certain embodiments, the emission spectrum features Fi, e.g., include edges, maxima, minima and/or other types of identifiable features, each occurring at one of the spectral reference lines $\lambda$ri.

Imposing the attenuation pattern on the light Ba, Bb emitted by the broad band light source 1a, 1b, is e.g., attained by the filter 3a, 3b being an attenuation pattern filter and/or by the filter 3a, 3b exhibiting a wavelength-dependent (or frequency-dependent) transmissivity T corresponding to the attenuation pattern to be imposed on the received light Ba, Bb.

Figure 4:
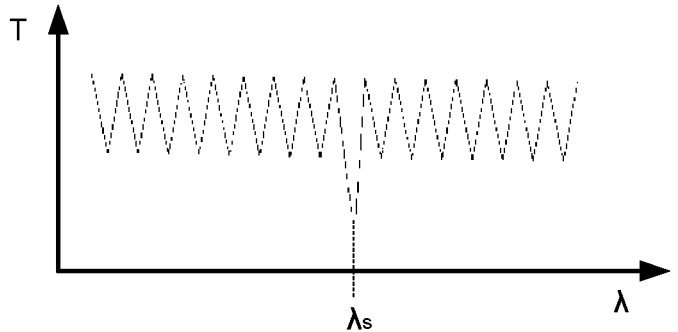
FIG. 4 shows a wavelength-dependent transmissivity of a filter in arbitrary units.
Figure 5:
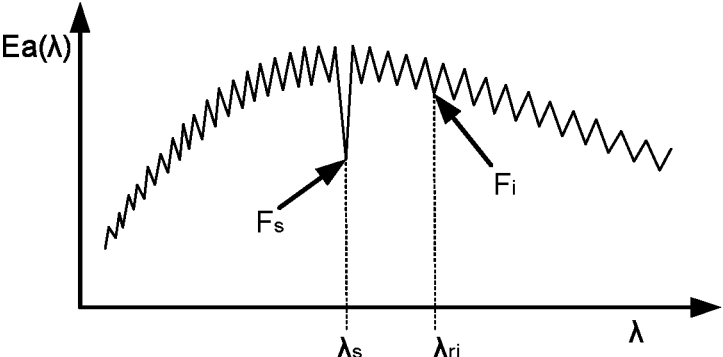
FIG. 5 shows an emission spectrum of a calibration light source according to the present disclosure including a filter imposing a saw tooth pattern on light emitted by a broad band light source in arbitrary units.

In certain embodiments, the attenuation pattern is, e.g., a wavelength-dependent (or frequency-dependent) pattern of alternatingly increasing and decreasing attenuation, e.g., a sawtooth pattern. In such an embodiment, the filter 3a is, e.g., a filter exhibiting a transmissivity T that alternately increases and decreases as a function of the spectral line $\lambda$. An example of a corresponding transmissivity T of the filter 3a is shown in FIG. 4. The alternatingly increasing and decreasing transmissivity T of the filter 3a causes the emission spectrum Ea($\lambda$) of the calibration light source 10a to exhibit a correspondingly alternatingly increasing and decreasing intensity. An exemplary emission spectrum Ea($\lambda$) of the calibration light source 10a including the filter 3a imposing a sawtooth attenuation pattern on the light Ba provided by the broad band light source 1a is shown in FIG. 5.

Depending on the spectral shape of the attenuation pattern, various different types of filters may be used. As shown in FIG. 1, in certain embodiments, the filter 3a, e.g., includes at least one filtering element or a combination of filtering elements. The filtering element(s), e.g., include an etalon filter, a multivariate optical element filter, a jammed array wideband sawtooth filter, an interference filter, and/or at least one other type of optical filtering element. The filtering element(s) provide(s) the advantage that the attenuation pattern and the spectral reference lines $\lambda$ri at which the emission spectrum features Fi occur can be tailored as needed based on the wavelength-dependent (or frequency-dependent) transmissivity of the choice of filtering element (s) employed. Thus, the filter 3a can easily be configured such that the spectral reference lines $\lambda$ri are distributed across the broad spectral range covered by the emission spectrum Ea($\lambda$) of the calibration light source 10a and/or a spectral range of interest in a specific application.

Figure 6:
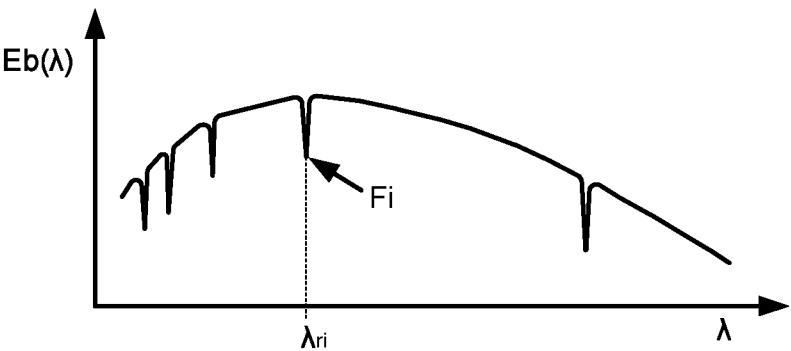
FIG. 6 shows an emission spectrum of a calibration light source according to the present disclosure including an absorption filter containing a gas exhibiting atomic absorption lines in arbitrary units.

In alternative embodiments, another type of filter may be used instead. FIG. 3 shows an embodiment, wherein the filter 3b is an absorption filter including a gas 9 exhibiting known atomic absorption lines. In such an embodiment, the attenuation pattern is imposed on the light Bb emitted by the broad band light source 1b by the gas 9 selectively absorbing fractions of the light Bb transmitted through the gas 9 at the spectral reference lines $\lambda$ri corresponding to the atomic absorption lines of the gas 9. This is illustrated in FIG. 6, which shows an exemplary emission spectrum Eb($\lambda$) of the calibration light source 10b attained by transmitting the light Bb provided by the broad band light source 1b through the gas 9 included in the absorption filter 3b.

The gas 9 may be, e.g., a pure gas consisting of a single component or a mixed gas consisting of a mixture of two or more components. In certain embodiments, the gas 9, e.g., includes neon, argon, xenon, and/or at least one other component. Embodiments in which the gas 9 includes multiple components provide the advantage of a correspondingly large number of spectral reference lines $\lambda$ri, including the different atomic absorption lines of each of the individual components. Thus, by the gas 9 including multiple components exhibiting different atomic absorption lines, a good distribution of the spectral reference lines $\lambda$ri throughout the broad spectral range covered by the emission spectrum Eb($\lambda$) of the calibration light source 10b and/or throughout a spectral range of interest in a specific application is attained.

As illustrated in FIG. 3, in certain embodiments, the gas 9 is, e.g., contained in a container 11 including a light inlet 13, through which the light Bb emitted by broad band light source 1b enters the container 11 and a light outlet 15, through which the structured light Sb exits the container 11.

The exemplary container 11 shown in FIG. 3 includes a transparent window 17 closing off the light inlet 13 and a transparent windows 19 closing off the light outlet 15. As an alternative, a transparent container or a container including transparent container wall sections closing off the light inlet and the light outlet may be used instead.

In certain embodiments, the container 11 is, e.g., a cell, a tube, a hollow core optical fiber, or another type of container. Regardless, the amount of light absorbed by the gas 9 at the multiple atomic absorption lines increases with increasing length of an optical path OP extending through the gas 9 inside the container 11, along which the light Bb provided by the broad band light source 1b interacts with the gas 9. In this respect, tubes and hollow core optical fibers provide the advantage of a longer optical path length, which in turn results in more pronounced emission spectrum features Fi. Tubes as well as hollow core optical fibers may, e.g., be arranged in a line. In alternative embodiments, the container 11 is, e.g., embodied as a flexible tube or a hollow core optical fiber that is at least partially arranged in a coil. The latter provides the advantage that a more compact assembly is attained.

Regardless of the type of filter 3a, 3b employed, in certain embodiments, the attenuation pattern imposed on the received light Ba, Bb may, e.g., be configured such that the emission spectrum features Fi include at least one special feature Fs that is distinguishable from the other emission spectrum features Fi, e.g., a distinct, special spectral feature exhibiting a distinguishably higher or lower emission spectrum intensity than emission spectrum features Fi located in the vicinity of the special feature Fs.

As an example, shown in FIGS. 4 and 5, the identifiably distinct, spectral special feature Fs is, e.g., achieved by the transmissivity T of the filter 3a exhibiting an absolute minimum at the spectral reference line As at which the special feature Fs occurs.

The emission spectrum features Fi including at least one identifiably distinct special feature Fs is particularly advantageous with respect to periodic attenuation patterns, where it enables easier identification of each emission spectrum feature Fi individually, e.g., based on its position relative to the distinct special feature Fs.

With respect to atomic absorption filters, like the filter 3b containing the gas 9 shown in FIG. 3, the individual emission spectrum features Fi may, e.g., be considered as identifiably distinct special feature Fs, that are identifiably based on the sequence of different distances between the spectral reference lines $\lambda$r at which they occur.

In certain embodiments, identifiability of the individual emission spectrum features Fi may be further enhanced by the gas 9 having a composition in which a concentration of one of the components is significantly higher than a concentration of each other component included in the gas 9. This enables for the emission spectrum features Fi associated to the atomic absorptions lines of the component included in the highest concentration to be differentiated from the emission spectrum features Fi associated to the atomic absorptions lines of the other component(s) based on their lower spectral intensities.

Regardless of whether the emission spectrum features Fi includes at least one identifiably distinct special feature Fs or not, calibration light sources according to the present disclosure are not limited to the embodiments of the calibration light source 10a, 10b shown in FIGS. 1 and 3. As an example, the broad band light source 1a shown in FIG. 1 or another type of broad band light source may be used in the calibration light source 10b shown in FIG. 3 and vice versa. As another example, the filter 3a shown in FIG. 1 or another type of filter may be used in the calibration light source 10b shown in FIG. 3 and vice versa. In either such embodiment, the calibration light source 10a, 10b disclosed herein provides the advantage listed above.

Figure 7:
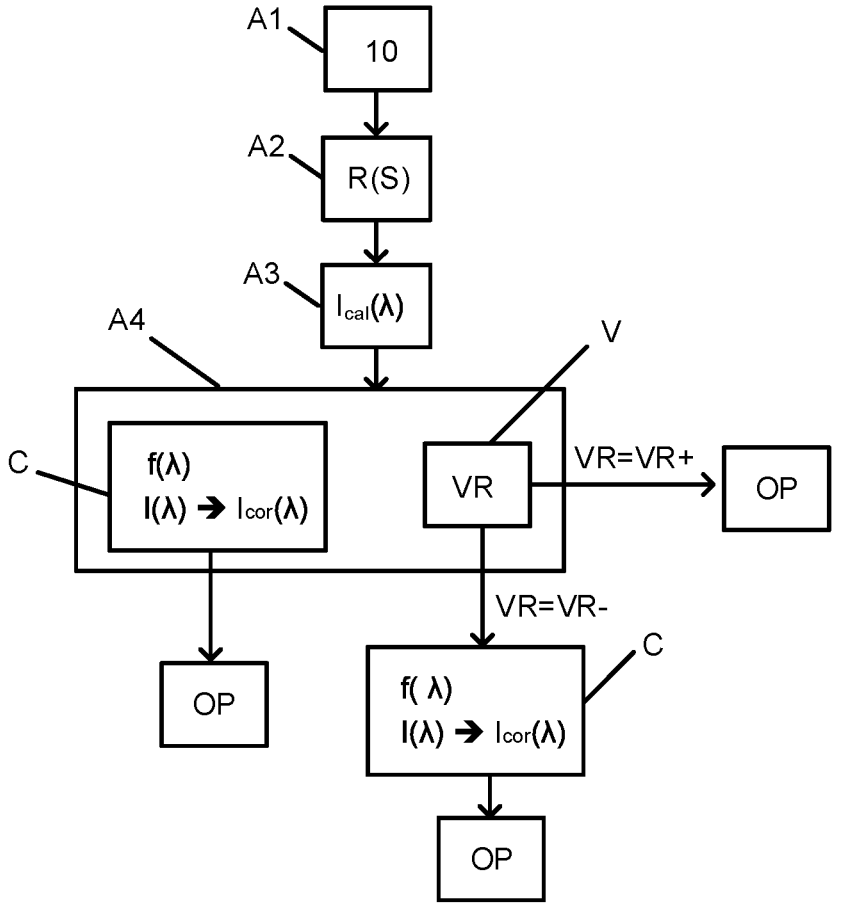
FIG. 7 shows a flow chart of a method of calibrating at least one spectrometer according to the present disclosure.

The calibration light source 10a, 10b described herein is preferably employed to calibrate at least one dispersive spectrometer 20. A flowchart of a method of calibrating at least one dispersive spectrometer 20 is shown in FIG. 7.

The at least one dispersive spectrometer 20 to be calibrated, e.g., include at least one spectrometer 20 requiring an initial calibration, and/or at least one spectrometer 20 that has previously been calibrated, e.g., by a previous performance of the calibration method disclosed herein or by another calibration method. In this respect using the calibration light source 10a, 10b provides the advantage that it enables calibrations including a calibration of a spectral axis and/or an intensity axis of the respective spectrometer 20, as well as calibrations including a verification of a previous calibration of the respective previously calibrated spectrometer 20.

The, or each, dispersive spectrometer 20 to be calibrated is, e.g., configured to receive incident light, to disperse the incident light, and to determine and provide intensity spectra $I(\lambda)$ of the dispersed incident light in a spectral measurement range $\Delta\lambda$. The spectral measurement range $\Delta\lambda$ is, e.g., a predetermined wavelength range or a predetermined frequency range.

As shown in FIG. 1, in certain embodiments, the at least one or each dispersive spectrometer 20, e.g., includes a disperser 21, e.g., a diffractive or holographic grating operable to disperse incident light, a detector 23 including an array of detection elements, and a signal processor 25, e.g., a microprocessor, configured to determine and provide intensity spectra $I(\lambda)$ of the light received by the detector 23. Each detection element is, e.g., configured to receive a fraction of the dispersed light and to determine and provide a detection signal corresponding to an intensity of the received fraction of the dispersed light to the signal processor 25, which determines and provides spectral intensity values of the intensity spectra $I(\lambda)$ based on the corresponding detection signals provided by the detector 23. In certain embodiments, the detector 23 is, e.g., a CCD camera, an array of photodiodes or another type of detector including an array of detection elements.

As shown in FIG. 7 the calibration method disclosed herein includes a method step A1 of providing a calibration light source 10 configured as described in reference to the exemplary calibration light sources 10a, 10b shown in FIGS. 1 and 3. The method further includes a method step A2 of providing a reference characteristic $R(S)$ of the structured light $S$ emitted by the calibration light source 10. As an example, in certain embodiments, the structured light $S$ is, e.g., given by the structured light $Sa$ emitted by the calibration light source 10a shown in FIG. 1 or the structured light $Sb$ emitted by the calibration light source 10b shown in FIG. 3.

Depending on the types of calibrations to be performed with the calibration light source 10, the reference characteristic $R(S)$, e.g., includes the emission spectrum $E(\lambda)$ of the calibration light source 10 and/or the spectral reference lines $\lambda ri$ at which the emission spectrum features $Fi$ of the emission spectrum $E(\lambda)$ of the calibration light source 10 occur. As an example, in certain embodiments, the emission spectrum $E(\lambda)$ is, e.g., given by the emission spectrum $Ea(\lambda)$ emitted by the calibration light source 10a shown in FIG. 1 or by the emission spectrum $Eb(\lambda)$ emitted by the calibration light source 10b shown in FIG. 3.

In either case, the emission spectrum $E(\lambda)$ is, e.g., determined and provided based on at least one intensity spectrum of the structured light $S$ emitted by the calibration light source 10 that is determined and provided by a spectroscopic measurement instrument. In certain embodiments, the determination of each intensity spectrum is, e.g., performed by a highly accurate spectroscopic measurement instrument and/or under laboratory conditions.

The reference lines $\lambda ri$ are, e.g., determined and provided by identifying the emission spectrum features $Fi$ in the emission spectrum $E(\lambda)$ and by, for each identified emission spectrum feature $Fi$, determining and providing the spectral reference line $\lambda ri$ at which the particular emission spectrum feature $Fi$ occurs. As an alternative available with embodiments in which the filter 3b is an absorption filter including the gas 9 exhibiting the known atomic absorption lines, the known atomic absorption lines are, e.g., provided as spectral reference lines $\lambda ri$.

The method further includes, for each spectrometer 20 to be calibrated, performing a method step A3 of with the respective spectrometer 20 determining a calibration spectrum $I_{cal}(\lambda)$ of the structured light $S$ emitted by the calibration light source 10, and a method step A4 of calibrating the respective spectrometer 20 based on the calibration spectrum $I_{cal}(\lambda)$ and the reference characteristic $R(S)$.

Figure 8:
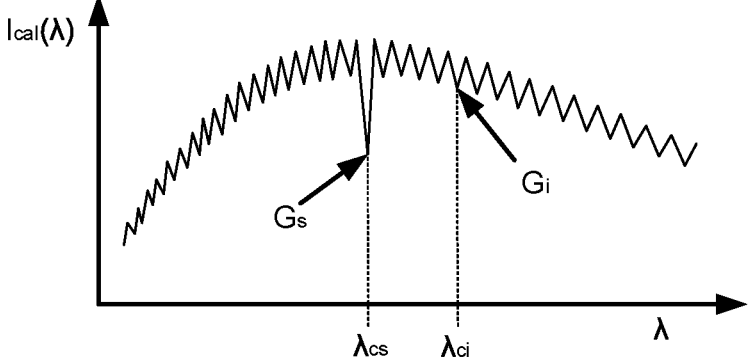
FIG. 8 shows an example calibration spectrum according to the present disclosure in arbitrary units.

In method step A3, determining the calibration spectrum $I_{cal}(\lambda)$ is, e.g., performed as shown in FIG. 1 by positioning the calibration light source 10 in front of the respective spectrometer 20, by receiving the structured light $S$ emitted by the calibration light source 10 with the spectrometer 20, and by determining and providing the calibration spectrum $I_{cal}(\lambda)$ of the received structured light $S$ with the spectrometer 20. An exemplary calibration spectrum $I_{cal}(\lambda)$ of the structured light $Sa$ emitted by the calibration light source 10a exhibiting the emission spectrum $Ea(\lambda)$ shown in FIG. 5 is shown in FIG. 8.

Due to the emission spectrum $E(\lambda)$ of the calibration light source 10 exhibiting the emission spectrum features $Fi$ at the reference lines $\lambda ri$, the calibration spectrum $I_{cal}(\lambda)$ exhibits distinct, identifiable calibration spectrum features $Gi$, each occurring at a corresponding calibration spectrum line $\lambda ci$. Each calibration spectrum feature $Gi$ of the calibration spectrum $I_{cal}(\lambda)$ is associated to one of the emission spectrum features $Fi$ of the emission spectrum $E(\lambda)$ of the calibration light source 10. Correspondingly, each calibration spectrum line $\lambda ci$ is associated to one of the reference lines $\lambda ri$.

As shown in FIG. 7, for at least one of the spectrometers 20 to be calibrated, the method step A4 of calibrating the respective spectrometer 20, e.g., includes a method step C of calibrating a spectral axis and/or an intensity axis of the respective spectrometer 20 based on the calibration spectrum $I_{cal}(\lambda)$ and the reference characteristic $R(S)$.

Calibrating the spectral axis of the respective spectrometer 20 is, e.g., performed based on the calibration spectrum $I_{cal}(\lambda)$ by identifying the calibration spectrum features $Gi$ included the calibration spectrum $I_{cal}(\lambda)$ and determining the calibration spectrum lines $\lambda ci$ at which the identified calibration spectrum features $Gi$ occur. Following this, the spectral axis of the respective spectrometer 20 is calibrated based on the calibration spectrum lines $\lambda ci$ and the corresponding spectral reference lines $\lambda ri$, at which the emission spectrum features $Fi$ corresponding to the respective calibration spectrum features $Gi$ occur.

Considering that the calibration spectrum features $Gi$ occur in the same order along the spectral axis $\lambda$ as the corresponding emission spectrum features $Fi$, the emission spectrum feature $Fi$ associated to each calibration spectrum feature $Gi$ is, e.g., determined based on the order of occurrence of the calibration spectrum features $Gi$ and the order of occurrence of the emission spectrum features $Fi$ along the spectral axis $\lambda$. Once the emission spectrum feature $Fi$ associated to each calibration spectrum feature $Gi$ has been determined, the spectral reference lines $\lambda ri$ corresponding to the calibration spectrum line $\lambda ci$ at which the respective calibration spectrum feature Gi occurred is given by the spectral reference lines $\lambda$ri at which the associated emission spectrum feature Fi occurs.

As shown in FIG. 8, in embodiments in which the emission spectrum features Fi include the distinguishable special feature Fs, the calibration spectrum $I_{cal}(\lambda)$ includes a corresponding special calibration spectrum feature Gs that is distinguishable from the other calibration spectrum features Gi. In such embodiments, the special calibration spectrum feature Gs and the corresponding special feature Fs of the emission spectrum $E(\lambda)$ are, e.g., taken as reference points and the determination of the emission spectrum features Fi corresponding to the other calibration spectrum features Gi is, e.g., performed based on their order of occurrence along the spectral axis relative to the reference points.

In certain embodiments, calibrating the spectral axis of the respective spectrometer 20, e.g., includes based on the calibration spectrum lines $\lambda$ci and the corresponding reference lines $\lambda$ri determining and subsequently applying a mapping function $f(\lambda)$ correctly assigning the spectral lines received by the individual detector elements, e.g., the CCD camera pixels or the photodiodes, to the respective detector elements such that calibration spectrum lines $\lambda$ci of a calibration spectrum determined by the spectrometer 20 based on this mapping function $f(\lambda)$ coincide with the corresponding spectral reference lines $\lambda$ri.

Calibrating the intensity axis of the respective spectrometer 20 is, e.g., performed based on the spectral intensity values of the calibration spectrum $I_{cal}(\lambda)$ and the corresponding spectral intensity values of the emission spectrum $E(\lambda)$ of the calibration light source 10.

In certain embodiment, calibrating the intensity axis, e.g., includes adjusting a determination of spectral intensity values of the intensity spectra $I(\lambda)$ performed by the respective spectrometer 20. The adjustment of the determination of the intensity values of the intensity spectra $I(\lambda)$ performed by the spectrometer 20 to be calibrated is, e.g., performed by determining and applying spectral correction terms, spectral correction factors or a spectral correction function for correcting the spectral intensity values determined by the respective spectrometer 20 such that the corrected spectral intensity values of the calibration spectrum $I_{cal}(\lambda)$ correspond to the spectral intensity values of the emission spectrum $E(\lambda)$ of the calibration light source 10. Following the adjustment, intensity spectra $I(\lambda)$ determined and provided by the thus calibrated spectrometer 20 are then given by correspondingly corrected intensity spectra.

With respect to spectrometers 20 for which the calibration performed in method step C includes both the calibration of the spectral axis and the calibration of the intensity axis, the calibration of the spectral axis is preferably performed before the calibration of the intensity axis.

Method step C of calibrating the spectral axis and/or the intensity axis can be performed regardless of whether the respective spectrometer 20 has previously been calibrated.

Following method step C, the respective spectrometer 20 is, e.g., put back into operation as indicated by the method step OP of operating the spectrometer 20 shown in FIG. 7. Subsequently, the spectrometer 20 may be operated for a time period until it is next calibrated again, e.g., by performing the method disclosed herein or by performing another calibration method. In either case, the next calibration, e.g., includes a verification of the previous calibration and/or a re-calibration of the spectral axis and/or the intensity axis of the respective spectrometer 20.

In case the spectrometer(s) 20 to be calibrated include at least one spectrometer 20, which was previously calibrated, e.g., by the method disclosed herein or by another calibration method, for at least one or each previously calibrated spectrometer 20, the method step A4 of calibrating the respective spectrometer 20, e.g., includes a method step V of verifying the previous calibration of the respective spectrometer 20 and of determining and providing a corresponding verification result VR.

Verifying the previous calibration, e.g., includes determining a degree of correspondence between the calibration spectrum $I_{cal}(\lambda)$ determined by the respective spectrometer 20 and the emission spectrum $E(\lambda)$ of the calibration light source 10 and includes determining and providing a verification result VR based on the degree of correspondence.

In this case, determining and providing the verification result VR, e.g., includes providing a positive verification result VR:=VR+, indicating that the previous calibration of the respective spectrometer 20 is valid when the degree of correspondence is larger or equal to a predetermined threshold. In addition or as an alternative, determining and providing the verification result VR e.g., includes providing a negative verification result VR:=VR−, indicating that the previous calibration of the respective spectrometer 20 is invalid when the degree of correspondence is smaller than the predetermined threshold.

In certain embodiments, the degree of correspondence is, e.g., determined based on the differences between the spectral intensity values of the calibration spectrum $I_{cal}(\lambda)$ and the corresponding spectral intensity values of the emission spectrum $E(\lambda)$ and/or based on the differences between the calibration spectrum lines $\lambda$ci at which the calibration spectrum features Gi occur in the calibration spectrum $I_{cal}(\lambda)$ and the corresponding reference lines $\lambda$ri at which the emission spectrum features Fi corresponding to the respective calibration spectrum features Gi occur in the emission spectrum $E(\lambda)$ of the calibration light source 10.

In certain embodiments, at least one additional method step may be performed based on the verification result VR.

As an example, at least one or each spectrometer 20 for which a positive verification result VR:=VR+, indicating that the previous calibration of the respective spectrometer 20 is valid, has been determined in method step V is, e.g., put back into operation as indicated by the method step OP of operating the spectrometer 20 shown in FIG. 7. In this case, the respective spectrometer(s) 20 is, e.g., is put back into operation for a time period until it is next calibrated again, e.g., by performing the method disclosed herein or by performing another calibration method. In either case, the next calibration, e.g., includes a verification of the previous calibration and/or a re-calibration of the spectral axis and/or the intensity axis of the respective spectrometer 20.

In addition or as an alternative, at least one or each spectrometer 20 for which a negative verification result VR:=VR−, indicating that the previous calibration of the respective spectrometer 20 is invalid, has been determined in method step V is, e.g., re-calibrated before it is put back into operation.

Re-calibrating the respective spectrometer(s) 200 is, e.g., performed as shown in FIG. 7 by performing method step C of the method disclosed herein or by performing another calibration method.

Re-calibrating the respective spectrometer(s) by performing the method step C of calibrating the spectral axis and/or the intensity axis of the respective spectrometer(s) 20 provides the advantage that this re-calibration can be performed immediately based on the calibration spectrum $I_{cal}(\lambda)$ that

15 has previously been used to determine the verification result VR. This provides the advantage that neither re-calibrating the spectral axis nor re-calibrating the intensity axis of the respective spectrometer(s) 20 requires any additional calibration measurements to be performed with the respective spectrometer 20.

Following the re-calibration, the respective spectrometer 20 may be, e.g., put back into operation for a time period until it is next calibrated again, e.g., by performing the method disclosed herein or by performing another calibration method. In either case, the next calibration, e.g., includes a verification of the previous calibration and/or a re-calibration of the spectral axis and/or the intensity axis of the respective spectrometer 20.

I claim:

1. A calibration light source for calibrating at least one spectrometer, the calibration light source comprising:
a broad band light source operable to emit light in a broad spectral range; and
a filter configured to receive the light emitted by the broad band light source and to provide structured light by imposing a predefined attenuation pattern exhibiting pattern features at multiple spectral reference lines on the received light such that an emission spectrum of the structured light emitted by the calibration light source exhibits distinct emission spectrum features corresponding to the pattern features at the multiple spectral reference lines, wherein the predefined attenuation pattern is embodied to distribute the distinct emission spectrum features across a spectral measurement range of the at least one spectrometer to improve calibration accuracy.

2. The calibration light source according to claim 1, wherein, at least one of:
the emission spectrum features include edges, maxima, minima and/or other types of identifiable features, each occurring at one of the spectral reference lines;
the emission spectrum features include at least one special feature that is distinguishable from the other emission spectrum features; and
the attenuation pattern is a wavelength-dependent pattern of alternatingly increasing and decreasing attenuation or a sawtooth pattern causing the emission spectrum of the calibration light source to exhibiting a correspondingly alternatingly increasing and decreasing intensity.

3. The calibration light source according to claim 1, wherein the filter includes at least one filtering element or a combination of filtering elements, the filtering element(s) including at least one of: an etalon filter, a multivariate optical element filter, a jammed array wideband sawtooth filter, and an interference filter.

4. The calibration light source according to claim 1, wherein:
the filter includes a gas exhibiting known atomic absorption lines;
the gas:
is a pure gas consisting of a single component or is a mixed gas comprising two or more components exhibiting different atomic absorption lines; and/or
includes neon, argon, xenon, and/or at least one other component; and
the light emitted by the broad band light source is transmitted through the gas, which selectively absorbs fractions of the light at the spectral reference lines corresponding to the atomic absorption lines of the gas.

5. The calibration light source according to claim 4, wherein:

the filter includes a container configured to contain the gas;
the container is a cell, a tube, a flexible tube that is at least partially arranged in a coil, a hollow core optical fiber, a hollow core optical fiber that is at least partially arranged in a coil, or another type of container;
the container includes a light inlet or a transparent window closing off the container, through which light emitted by broad band light source enters the container, and
the container includes a light outlet or a transparent window closing off the container, through which the structured light exits the container.

6. The calibration light source according to claim 1, wherein:
the broad band light source includes a black-body radiator, an incandescent lamp, or a tungsten lamp; or
the broad band light source includes an excitation light source operable to emit excitation light and a luminescent material emitting luminescence light in response to the luminescent material receiving the excitation light, wherein the luminescent material is a fluorescent material, a fluorescent glass, or another type of luminescent material.

7. A method of calibrating at least one spectrometer, the method comprising:
providing a calibration light source comprising:
a broad band light source operable to emit light in a broad spectral range; and
a filter configured to receive the light emitted by the broad band light source and to provide structured light by imposing an attenuation pattern exhibiting pattern features at multiple spectral reference lines on the received light such that an emission spectrum of the structured light emitted by the calibration light source exhibits distinct emission spectrum features corresponding to the pattern features at the multiple spectral reference lines;
providing a reference characteristic of the structured light emitted by the calibration light source, the reference characteristic including at least one of: the emission spectrum of the calibration light source; and the spectral reference lines at which the emission spectrum features of the emission spectrum of the calibration light source occur; and
with each respective spectrometer:
determining a calibration spectrum of the structured light emitted by the calibration light source; and
calibrating the respective spectrometer based on the calibration spectrum and the reference characteristic.

8. The method according to claim 7, wherein calibrating the respective spectrometer includes calibrating a spectral axis and/or an intensity axis of the respective spectrometer, and/or verifying a previous calibration of the respective spectrometer.

9. The method according to claim 7, wherein:
the reference characteristic includes the spectral reference lines; and
for at least one or each of the at least one spectrometer to be calibrated, calibrating the respective spectrometer includes calibrating a spectral axis of the spectrometer by:
identifying calibration spectrum features included in the calibration spectrum;
determining calibration spectrum lines at which the identified calibration spectrum features occur; and calibrating the spectral axis of the respective spectrometer based on the calibration spectrum lines and the corresponding spectral reference lines, at which the emission spectrum features corresponding to the calibration spectrum features occur.

10. The method according to claim 9, wherein:

for each calibration spectrum feature, determining the emission spectrum feature corresponding to the respective calibration spectrum feature based on an order of occurrence of the calibration spectrum features along the spectral axis corresponding to an order of occurrence of the emission spectrum features along the spectral axis and on the spectral reference line corresponding to the calibration spectrum line at which the respective calibration spectrum feature occurred is given by the spectral reference line at which the corresponding emission spectrum feature occurs; and/or determining the emission spectrum features corresponding to other calibration spectrum features based on a respective order of occurrence along the spectral axis relative to reference points, wherein:

the emission spectrum features include a special feature that is distinguishable from the other emission spectrum features;

the calibration spectrum includes a special calibration spectrum feature corresponding to the distinguishable special feature that is distinguishable from the other calibration spectrum features; and the reference points are the special calibration spectrum feature and the corresponding special feature of the emission spectrum.

11. The method according to claim 9, wherein:

at least one of the spectrometers includes a disperser, which disperses incident light, a detector including an array of detection elements, and a signal processor configured to determine and provide intensity spectra of the light received by the detector, wherein each detection element receives a fraction of the dispersed light and provides a detection signal corresponding to an intensity of the received fraction of the dispersed light, and wherein the signal processor determines and provides spectral intensity values of the intensity spectra based on the detection signals; and calibrating the spectral axis of the respective spectrometer includes, based on the calibration spectrum lines and the corresponding reference lines, determining and subsequently applying a mapping function correctly assigning spectral lines received by the individual detector elements to the respective detector elements such that calibration spectrum lines of a calibration spectrum determined by the respective spectrometer based on the mapping function coincide with the corresponding spectral reference lines.

12. The method according to claim 7, wherein:

the reference characteristic includes the emission spectrum of the calibration light source; and for at least one or each of the at least one spectrometer to be calibrated, calibrating the respective spectrometer includes calibrating an intensity axis of the respective spectrometer based on spectral intensity values of the calibration spectrum and corresponding spectral intensity values the emission spectrum.

13. The method according to claim 12, wherein calibrating the intensity axis of the respective spectrometer includes adjusting a determination of spectral intensity values of intensity spectra performed by the respective spectrometer by determining and applying spectral correction terms, spectral correction factors, or a spectral correction function for correcting spectral intensity values determined by the respective spectrometer such that the corrected spectral intensity values of the calibration spectrum correspond to the spectral intensity values of the emission spectrum of the calibration light source.

14. The method according to claim 7, wherein:

the reference characteristic includes the emission spectrum and the spectral reference lines; and for at least one or each of the at least one spectrometer to be calibrated, calibrating the respective spectrometer includes:

identifying calibration spectrum features included the calibration spectrum;

determining calibration spectrum lines at which the identified calibration spectrum features occur;

calibrating the spectral axis of the respective spectrometer based on the calibration spectrum lines and the corresponding spectral reference lines at which the emission spectrum features corresponding to the calibration spectrum features occur; and subsequently calibrating an intensity axis of the respective spectrometer based on spectral intensity values of the calibration spectrum and corresponding spectral intensity values of the emission spectrum.

15. The method according to claim 7, wherein:

the reference characteristic includes the emission spectrum; and for at least one or each spectrometer that was previously calibrated, calibrating the respective spectrometer includes, based on the calibration spectrum determined by the respective spectrometer and the emission spectrum of the calibration light source, verifying the previous calibration of the respective spectrometer and determining and providing a corresponding verification result.

16. The method according to claim 15, wherein:

verifying the previous calibration of the respective spectrometer includes determining a degree of correspondence between the calibration spectrum determined by the respective spectrometer and the emission spectrum of the calibration light source; and determining and providing the verification result includes:

providing a positive verification result indicating that the previous calibration of the respective spectrometer is valid when the degree of correspondence is larger or equal to a predetermined threshold; and/or providing a negative verification result indicating that the previous calibration of the respective spectrometer is invalid when the degree of correspondence is smaller than the predetermined threshold.

17. The method according to claim 15, further comprising, for at least one or each spectrometer for which a verification result indicating that the previous calibration of the respective spectrometer is invalid, re-calibrating the spectral axis and/or the intensity axis of the respective spectrometer based on the calibration spectrum determined by the respective spectrometer and the reference characteristic of the light emitted by the calibration light source.

* * * * *